(12) United States Patent
Nagatomi

(10) Patent No.: US 9,761,868 B2
(45) Date of Patent: Sep. 12, 2017

(54) LITHIUM—TRANSITION METAL OXIDE POWDER AND METHOD OF PRODUCING THE SAME, POSITIVE ELECTRODE ACTIVE MATERIAL FOR LITHIUM ION BATTERY, AND LITHIUM ION SECONDARY BATTERY

(75) Inventor: Akira Nagatomi, Tokyo (JP)

(73) Assignee: DOWA HOLDINGS CO., LTD., Tokyo (JP)

( * ) Notice: Subject to any disclaimer, the term of this patent is extended or adjusted under 35 U.S.C. 154(b) by 693 days.

(21) Appl. No.: 13/818,264

(22) PCT Filed: Sep. 21, 2011

(86) PCT No.: PCT/JP2011/071444
§ 371 (c)(1),
(2), (4) Date: Mar. 28, 2013

(87) PCT Pub. No.: WO2012/043321
PCT Pub. Date: Apr. 5, 2012

(65) Prior Publication Data
US 2013/0209890 A1    Aug. 15, 2013

(30) Foreign Application Priority Data

Sep. 28, 2010  (JP) ................................. 2010-217900

(51) Int. Cl.

| H01M 4/36 | (2006.01) |
| H01M 4/131 | (2010.01) |
| H01M 10/0525 | (2010.01) |
| H01M 4/505 | (2010.01) |
| H01M 4/485 | (2010.01) |
| H01M 4/525 | (2010.01) |
| C01G 33/00 | (2006.01) |
| C01G 51/00 | (2006.01) |
| B82Y 30/00 | (2011.01) |
| H01M 4/1391 | (2010.01) |
| H01M 4/04 | (2006.01) |

(52) U.S. Cl.
CPC ............. *H01M 4/366* (2013.01); *B82Y 30/00* (2013.01); *C01G 33/00* (2013.01); *C01G 51/42* (2013.01); *H01M 4/131* (2013.01); *H01M 4/485* (2013.01); *H01M 4/505* (2013.01); *H01M 4/525* (2013.01); *H01M 10/0525* (2013.01); *C01P 2002/52* (2013.01); *C01P 2004/61* (2013.01); *C01P 2004/64* (2013.01); *C01P 2006/12* (2013.01); *C01P 2006/40* (2013.01); *C01P 2006/80* (2013.01); *H01M 4/0452* (2013.01); *H01M 4/1391* (2013.01); *H01M 2220/20* (2013.01); *H01M 2220/30* (2013.01); *Y02T 10/7011* (2013.01)

(58) Field of Classification Search
CPC ...................................................... H01M 4/366
See application file for complete search history.

(56) References Cited

U.S. PATENT DOCUMENTS

| 2009/0081554 A1 | 3/2009 | Takada et al. |
| 2009/0155692 A1 | 6/2009 | Park et al. |
| 2011/0045348 A1 | 2/2011 | Kubo et al. |
| 2011/0195309 A1* | 8/2011 | Nina ..................... H01M 4/485 429/223 |

FOREIGN PATENT DOCUMENTS

| JP | A-2004-253305 | 9/2004 |
| JP | A-2006-147500 | 6/2006 |
| JP | A-2009-152200 | 7/2009 |
| JP | A-2009-266728 | 11/2009 |
| JP | A-2010-129190 | 6/2010 |
| WO | WO 2007/004590 A1 | 1/2007 |
| WO | WO 2012/043321 A1 | 4/2012 |

OTHER PUBLICATIONS

International Search Report issued in International Patent Application No. PCT/JP2011/071444 dated Dec. 20, 2011. (translation).
Ohta et al., "LiNbO$_3$—coated LiCoO$_2$ as cathode material for all solid-state lithium secondary batteries," Electrochemistry Communications, 9 (2007), pp. 1486-1490.
Dec. 30, 2016 Office Action issued in U.S. Appl. No. 14/886,687.
Jun. 15, 2017 Office Action issued in U.S. Appl. No. 14/886,687.
Dey, Deepa, and Masato Kakihana. "Peroxide Route Towards Low Temperature Synthesis of LiNb03: An Environmentally Benign Approach". Journal Of The Ceramic Society Of Japan, vol. 112, No. 1307,2004, pp. 368-372.

* cited by examiner

*Primary Examiner* — Maria J Laios
*Assistant Examiner* — Robert S Carrico
(74) *Attorney, Agent, or Firm* — Oliff PLC

(57) ABSTRACT

There is provided a lithium-transition metal oxide powder with a coating layer containing lithium niobate formed on a part or the whole part of a surface of a lithium-transition metal oxide particle and having a low powder compact resistance, and a positive electrode active material for a lithium ion battery containing the lithium-transition metal oxide powder. Specifically, there is provided the lithium-transition metal oxide powder composed of a lithium-transition metal oxide particle with a part or the whole part of a surface coated with a coating layer containing lithium niobate, wherein a carbon-content is 0.03 mass % or less.

13 Claims, No Drawings

LITHIUM—TRANSITION METAL OXIDE POWDER AND METHOD OF PRODUCING THE SAME, POSITIVE ELECTRODE ACTIVE MATERIAL FOR LITHIUM ION BATTERY, AND LITHIUM ION SECONDARY BATTERY

TECHNICAL FIELD

The present invention relates to a lithium-transition metal oxide powder and a method of producing the same, a positive electrode active material for a lithium ion battery, and a lithium ion secondary battery.

DESCRIPTION OF RELATED ART

The lithium ion secondary battery is characterized in that energy density is high, and an operation at a high voltage is enabled, and therefore is used for an information device such as a cellular phone as a secondary battery that is easy to be miniaturized and reduced in weight. Further, in recent years, demand as the secondary battery for a large power of a hybrid car, etc., has been increased.

A non-aqueous solvent electrolyte in which salt is dissolved in an organic solvent as electrolyte, is generally used in the lithium ion secondary battery. The non-aqueous solvent electrolyte is flammable, and therefore the lithium ion secondary battery has a problem to be solved regarding safety. In order to secure the safety, a countermeasure such as assembling a safety device into the lithium ion secondary battery, is applied to the lithium ion secondary battery. However, there is proposed a method of providing the electrolyte as an inflammable electrolyte, namely, providing a lithium ion conductive solid electrolyte, as a more drastic solving method.

Generally, an electrode reaction of a battery is generated on an interface between an electrode active material and an electrolyte. When a liquid electrolyte is used as the electrolyte, an electrode containing the electrode active material is immersed into the electrolyte so that the electrolyte is permeated between active material particles, to thereby form a reaction interface. Meanwhile, when a solid electrolyte is used as the electrolyte, the solid electrolyte does not have such a permeating mechanism, and therefore there is a necessity for previously mixing powder of the electrode active material and powder of the solid electrolyte. Therefore, a positive electrode of an all-solid lithium battery is usually made of a mixed material of the powder of a positive electrode active material and the solid electrolyte.

However, in the all-solid lithium battery, resistance generated when the lithium ion moves on the interface between the positive electrode active material and the solid electrolyte (described as an "interface resistance" in some cases hereafter), is easily increased. When the interface resistance is increased, performance such as a battery capacity is reduced in the all-solid lithium battery.

Non-patent document 1 discloses as follows. The reason for increase of the interface resistance is that a reaction is induced between the positive electrode active material and the solid electrolyte, to thereby form a high resistance part on the surface of the positive electrode active material.

Also, non-patent document 1 discloses a technique of reducing the interface resistance by coating the surface of a lithium cobaltate being the positive electrode active material, with lithium niobate, and improving the performance of the all-solid lithium battery.

Specifically, non-patent document 1 discloses a technique of making an alcohol solution in which metal alkoxide such as Nb ethoxide and Li ethoxide is mixed, brought into contact with the surface of lithium-metal oxide such as lithium cobaltate, and thereafter sintering the lithium-metal oxide in the atmosphere, to thereby coat the surface with lithium niobate.

Meanwhile, patent document 1 also discloses a method of producing lithium cobaltate coated with lithium niobate.

Specifically, the alcohol solution in which metal alkoxide such as Nb ethoxide and Li ethoxide is mixed, is brought into contact with the surface of the lithium cobaltate, and thereafter the lithium cobaltate is sintered at a relatively low temperature of 260° C. to 300° C. This is a technique of suppressing a crystallization of the lithium cobaltate coated with lithium niobate, and reducing the interface resistance of a coating layer, by sintering at a low temperature as described above.

PRIOR ART DOCUMENT

Patent Document

Patent document 1: Japanese Patent Laid Open Publication No. 2010-129190

Non-Patent Document

Non-patent document 1: Electrochemistry Communications, 9 (2007), p. 1486-1490

SUMMARY OF THE INVENTION

Problem to be Solved by the Invention

Inventors of the present invention examine an electric resistance value of the lithium cobaltate coated with lithium niobate, which is produced by methods described in patent document 1 and non-patent document 1.

Here, since the lithium cobaltate is a powder body, a prescribed pressure is added to obtain a compact, and the electric resistance value of the compact of the lithium cobaltate (described as a "powder compact resistance" in some cases in the present invention) is measured. In the present invention, as described later in example 1, the prescribed pressure is obtained by putting 1 g of powder in a mold with a size of $\phi$20 mm, and adding thereto a pressure of 12 kN.

As a result of the examination, the inventors of the present invention have knowledge that the powder compact resistance of the lithium cobaltate powder with the surface coated with lithium niobate, is higher than the powder compact resistance of the lithium cobaltate powder with the surface not coated with lithium niobate. Namely, the inventors of the present invention have knowledge as follows. Although it is possible to prevent the formation of the high resistance part on the surface of the positive electrode active material, which is caused by the reaction induced between the positive electrode active material and the solid electrolyte when the lithium cobaltate with the surface coated with lithium niobate produced by the method described in the above-mentioned document, is applied to the all-solid lithium battery as the positive electrode active material, the electric resistance value of the positive active material itself is increased.

Further, regarding the metal alkoxide used in the method described in the patent document 1 and the non-patent document 1, a raw material cost is extremely high.

In view of the above-described circumstance, the present invention is provided, and in order to solve the above-described problem, an object of the present invention is to provide a method of producing a lithium-transition metal oxide powder in which a coating layer containing lithium niobate is formed on a part or the whole part of the surface of a lithium-transition metal oxide particle and having a low powder compact resistance, a positive electrode active material for a lithium ion battery containing the lithium-transition metal oxide powder, a lithium ion battery using the positive electrode active material for a lithium ion battery, and a method of producing the lithium-transition metal oxide powder without using a metal alkoxide.

Means for Solving the Problem

As a result of strenuous efforts by the inventors of the present invention regarding a cause for increasing the electric resistance value of the lithium-transition metal oxide powder with the surface coated with the lithium niobate, it is found that an organic matter derived from the metal alkoxide or an organic solvent, or carbon generated by decomposition of the organic matter, remains in the lithium niobate, because the metal alkoxide and the organic solvent are used as raw materials, when the surface of the lithium-transition metal oxide powder is coated with the lithium niobate. It is also found by the inventors of the present invention, that the remained organic matter or the carbon is a factor of inhibiting a movement of lithium, thus increasing the electric resistance value of the lithium-transition metal oxide powder.

As a result of a further pursuit by the inventors of the present invention, the following method is also found. Namely, a solution in which complex niobate and lithium salt are dissolved, and the lithium-transition metal oxide powder are brought into contact with each other, and thereafter the lithium-transition metal oxide powder is sintered at a temperature of 300° C. or more. Then, by sintering the lithium-transition metal oxide powder, the lithium-transition metal oxide powder with the surface coated with lithium niobate having less content of the organic matter (carbon) can be obtained. Thus, the inventors of the present invention has a knowledge that the lithium-transition metal oxide powder with the surface coated with the lithium niobate with less content of the organic matter (carbon), has a low powder compact resistance.

Namely, in order to solve the above-described problem, a first aspect of the present invention provides a lithium-transition metal oxide powder composed of a lithium-transition metal oxide particle with a part or the whole part of a surface coated with a coating layer containing lithium niobate, wherein a carbon-content is 0.03 mass % or less.

A second aspect of the present invention provides the lithium-transition metal oxide powder according to the first aspect, wherein a coating thickness of the coating layer containing the lithium niobate, is 100 nm or less.

A third aspect of the present invention provides the lithium-transition metal oxide powder according to the first aspect or the second aspect, wherein the lithium-transition metal oxide is lithium cobaltate.

A fourth aspect of the present invention provides the lithium-transition metal oxide powder according to anyone of the first to third aspects, wherein 1 g of powder to be treated is put in a mold with a size of φ20 mm, and a pressure of 12 kN is added thereto, to obtain a powder compact, with a powder compact resistance of 6000Ω·cm or less.

A fifth aspect of the present invention provides a positive electrode active material for a lithium ion battery, containing the lithium-transition metal oxide powder of any one of the first to fourth aspects.

A sixth aspect of the present invention provides a lithium ion secondary battery, wherein the positive electrode active material for the lithium ion battery of the fifth aspect is used as a positive electrode active material.

A seventh aspect of the present invention provides a method of producing a lithium-transition metal oxide powder composed of a lithium-transition metal oxide particle with a part or the whole part of a surface coated with a coating layer containing lithium niobate, including:

mixing an aqueous solution containing a niobium compound and a lithium compound, and a lithium-transition metal oxide powder, to obtain a mixture;

removing a water of the mixture, to obtain a powder in which the niobium compound and the lithium compound are adhered to the surface of the lithium-transition metal oxide powder; and applying a heat treatment to the powder at 300° C. or more and 700° C. or less.

An eighth aspect of the present invention provides the lithium-transition metal oxide powder according to the seventh aspect, wherein the niobium compound is a complex niobate.

A ninth aspect of the present invention provides the lithium-transition metal oxide powder according to the eighth aspect, wherein the complex niobate is a peroxo complex ($[Nb(O_2)_4]^{3-}$) of niobium oxide, or the complex niobate having oxalic acid in ligands.

Mode for Carrying Out the Invention

Modes for carrying out the invention will be described hereafter, wherein "lithium-transition metal oxide with a part or the whole part of the surface coated with a coating layer containing lithium niobate" is described as "lithium-transition metal oxide with the surface coated with lithium niobate" in some cases.

(1) Lithium-Transition Metal Oxide Powder

The type of a transition metal does not matter, provided that the lithium-transition metal oxide being a raw material for producing the lithium-transition metal oxide with the surface coated with lithium niobate, corresponds to the lithium-transition metal oxide that can be used as a conventional positive electrode active material for a lithium secondary battery.

However, Co, Mn, and Ni, can be given as suitable examples of the transition metal.

Further, when a balance of a battery capacity and safety is taken into consideration, lithium cobaltate can be given as an example of a suitable lithium-transition metal oxide.

For example, a compound expressed by the following formula 1 can be preferably given as the lithium-transition metal oxide including at least one kind selected from a group consisting of Ni, Mn, and Co, as a transition metal.

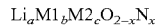  (Formula 1)

$$Li_aM1_bM2_cO_{2-x}N_x$$

In the formula 1, 0<a≤1.2, 0<b≤1, 0≤c≤0.1, 0.9≤b+c≤1, 0≤c≤0.05, and M1 is at least one kind selected from a group consisting of Ni, Co, Mn, and M2 is at least one kind selected from a group consisting of Al, Mg, Ca, Ti, V, Cr, Fe, and Ga, and N is at least one kind selected from a group consisting of F, Cl, and S. A value of a is further preferably in a range of 0.8 <a≤1.2.

A commercially available product may be used as the lithium-transition metal oxide powder. However, the lithium-transition metal oxide powder can be produced by a publicly-known method described below (an example of producing a lithium cobaltate powder).

Aqueous cobalt sulfate in which ammonium ion such as aqueous ammonia or ammonium sulfate is added, and aqueous sodium hydroxide are mixed so that a reaction solution has a pH of 12.0, to thereby generate cobalt oxyhydroxide. At this time, a reaction temperature is set to 60° C. or less, and a mixed solution is stirred while blowing air thereinto. Lithium carbonate is added and mixed into a liquid containing a generated spherical cobalt oxyhydroxide to obtain 1.0 to 1.05 mol of lithium over 1 mol of cobalt contained therein, and thereafter the mixed solution is filtered, washed, and dried, to thereby obtain a powder. The obtained powder is sintered at a temperature of 800° C. or more in the atmosphere for 3 hours or more, to thereby obtain a lithium cobaltate powder.

(2) Aqueous Solution Containing a Niobium Compound and a Lithium Compound

The niobium oxide does not dissolve in the aqueous solution, and therefore it is not suitable as a raw material of the aqueous solution containing the niobium compound and the lithium compound. Therefore, a complex niobate having water solubility is used as the raw material of the aqueous solution containing the niobium compound and the lithium compound. By mixing the aqueous solution containing the complex niobium and the lithium compound such as lithium salt, the aqueous solution containing the niobium compound and the lithium compound can be obtained.

<Complex Niobate>

The above-mentioned complex niobate is not particularly limited, provided that it has water solubility. However, peroxo complex ($[Nb(O_2)_4]^{3-}$) of niobium oxide, or the complex niobate having oxalic acid in ligands, is given as an example of a suitable complex niobate. The peroxo complex of niobium oxide does not contain carbon in a chemical structure, and therefore is particularly suitable. Meanwhile, although the oxalic acid contains carbon in the chemical structure, it is more easily thermally decomposed than ethoxide or methoxide, and has a structure containing much oxygen, and therefore can be used as a raw material of the complex niobate of the present invention.

The peroxo complex of niobium oxide can be obtained by the following method for example. The niobate ($Nb_2O_5 \cdot nH_2O$) is added and mixed into the hydrogen peroxide solution. Here, in the mixture, 8 mol or more of hydrogen peroxide is preferably mixed over 1 mol of niobium oxide. Further preferably, 10 mol or more of hydrogen peroxide is mixed therein, over 1 mol of niobium oxide, in consideration of a possibility that the hydrogen peroxide is decomposed during reaction. In the mixture, although the niobium oxide does not dissolve in the hydrogen peroxide solution, a milky-white suspension solution can be obtained. Then, aqueous ammonia is added and mixed into the suspension solution, to thereby obtain a transparent peroxo complex of niobium oxide.

Here, when the aqueous ammonia is added into the suspension solution, ammonia is set to 1 mol or more, over 1 mol of niobium oxide. 2 mol or more of ammonia is further preferable over 1 mol of niobium oxide, in consideration of volatilization of the ammonia during reaction. Further, an alkaline solution can be added instead of the aqueous ammonia. In this case, an addition amount of the alkaline solution is selected so that pH of the solution after addition is 10 or more, and preferably 11 or more. A lithium hydroxide aqueous solution is selected as the alkaline solution, and it can be added therein.

The complex niobate having the oxalic acid in the ligands can be obtained by a publicly-known method.

For example, the method includes a method of sequentially adding niobium hydroxide, oxalic acid, and aqueous ammonia into water, and a method of adding niobium oxide into aqueous oxalic acid.

Then, lithium salt is added into the aqueous solution containing the complex niobate obtained by the above-mentioned method, to thereby obtain the aqueous solution containing the niobium compound and the lithium compound. An amount of the added lithium salt is selected so that number of moles as lithium is equal to the number of moles as niobium contained in the aqueous solution. Lithium hydroxide (LiOH), lithium nitrate ($LiNO_3$), lithium sulfate ($Li_2SO_4$), etc., can be given as suitable examples of the added lithium salt compounds.

(3) Water Removing Step

The aqueous solution containing the complex niobate and the lithium salt compound obtained by the above-mentioned method, and the lithium-transition metal oxide powder are mixed, and thereafter the water is removed, to thereby obtain the lithium-transition metal oxide powder in which the niobium compound and the lithium compound are adhered to the surface.

A publicly-known method can be used as a method of removing water, and a method of heating the mixture and evaporating the water can be used.

By adjusting a relation between an amount of niobium and lithium and an amount of the lithium-transition metal oxide powder contained in the aqueous solution, an average coating thickness of the powder coated with lithium niobate, can be adjusted to a target average coating thickness. The target average coating thickness may be calculated from a specific surface area of the lithium-transition metal oxide powder to be coated, and the relation between the amount of the niobium and lithium contained in the aqueous solution, and the amount of the lithium-transition metal oxide powder. In this application, the coating thickness of the lithium niobate indicates the average coating thickness calculated by the above-mentioned method.

(4) Sintering Step

The lithium-transition metal oxide powder with the surface coated with lithium niobate can be obtained by sintering the lithium-transition metal oxide powder in which the niobium compound and the lithium compound are adhered to the surface, at a temperature of 300° C. or more and 700° C. or less.

By setting the sintering temperature at 300° C. or more, a sufficient reaction is induced between the niobium compound and the lithium compound on the surface, thereby producing lithium niobate ($LiNbO_3$), and not allowing unreacted lithium salt and amorphous niobium oxide to be remained.

Meanwhile, in order to obtain the lithium niobate as a coated material on the surface, the lithium-transition metal oxide powder is preferably sintered at a temperature of not less than a temperature of decomposing the added lithium salts. Here, by setting the sintering temperature at 700° C. or less, inter-diffusion occurs between the lithium-transition metal oxide powder and the generated lithium niobate, thus preventing the lithium niobate from diffusing to an inside of the lithium-transition metal oxide powder. Further, by setting the sintering temperature at 700° C. or less, formation of a coarse particle by sintering the particles, can also be prevented.

For the reason described above, the sintering temperature is preferably set to 300° C. or more and 600° C. or less, and further preferably set to 300° C. or more and 500° C. or less. Although sintering may be performed in the atmosphere, an oxidized gas can also be used. A sintering time can be set to 0.5 hours or more and 10 hours or less.

(5) Lithium-Transition Metal Oxide Powder with the Surface Coated with Lithium Niobate A carbon-content of the obtained lithium-transition metal oxide powder with the surface coated with the lithium niobate, is 0.03 mass % or less. It appears that this is because the complex niobate is used, in which a raw material not containing carbon or easily allowing the carbon to be desorbed, is used as the raw material of producing the niobium compound; and the lithium salt compound is used, which does not contain carbon as the raw material of producing the lithium compound.

In the lithium-transition metal oxide powder with the surface coated with the lithium niobate according to the present invention, the carbon-content of the powder is set to 0.03 mass % or less, to thereby set the powder compact resistance to 6000 $\Omega \cdot cm$ or less, which is the powder compact resistance of the powder compact formed in example 1 under a condition as will be described later.

When the lithium-transition metal oxide powder with the surface coated with the lithium niobate having such a high powder compact resistance, is used for the all-solid lithium battery as the positive electrode active material, it is possible to suppress the formation of the high resistance part on the surface of the positive electrode active material by the reaction between the positive electrode active material and the solid electrolyte. However, since the electric resistance value of the positive electrode active material itself is high, it appears that there is a limit in an effect of improving the battery characteristic by suppressing the formation of the high resistance part.

The average coating thickness of the lithium niobate of the lithium-transition metal oxide powder with the surface coated with lithium niobate, is preferably set to 1 nm or more and less than 100 nm. When the average coating thickness is set to less than 100 nm, the powder compact resistance of the powder can be suppressed, and when the average coating thickness is set to 1 nm or more, the formation of the high resistance part on the surface of the positive electrode active material by the reaction between the positive electrode active material and the solid electrolyte, can be sufficiently suppressed. The average coating thickness of the lithium niobate is preferably set to 1 nm to 50 nm, and more preferably set to 2 nm to 30 nm, in consideration of suppressing the powder compact resistance of the powder and the above-mentioned formation of the resistance part.

EXAMPLES

Example 1

The lithium-transition metal oxide powder with the surface coated with lithium niobate of example 1 was produced by a method described below.

Lithium cobaltate ($LiCoO_2$) powder having an average particle size of 5.14 μm and BET value of 0.234 $m^2/g$, was prepared.

Aqueous hydrogen peroxide was prepared, in which 5.8 g of hydrogen peroxide solution having a concentration of 30 mass % was added into 10 g of pure water. 0.6 g of niobium oxide ($Nb_2O_5 \cdot 6.1H_2O$(content of $Nb_2O_5$ was 70.7%)) was added into the aqueous hydrogen peroxide. After addition of the niobium oxide, 0.96 g of aqueous ammonia having a concentration of 28 mass % was further added, and the mixed solution was sufficiently stirred, to thereby obtain a transparent solution. 0.134 g of lithium hydroxide·1 hydrate ($LiOH \cdot H_2O$) was added into the obtained transparent solution, to thereby obtain an aqueous solution containing lithium and complex niobate.

The aqueous solution containing the lithium and the complex niobate was heated to 90° C., and 30 g of the lithium cobaltate powder was added thereto, and the mixed solution was stirred using a stirrer. The temperature was maintained to 90° C. to evaporate water until it was so judged that the water was completely eliminated visually, to thereby obtain a powder. Thereafter, the powder was heated and dried for 1 hour at 140° C. in the atmosphere, to thereby obtain a dried powder. The obtained dried powder was sintered for 3 hours at 400° C. in the air, to thereby obtain a lithium cobaltate powder with the surface coated with lithium niobate.

The average thickness of the lithium niobate of example 1 was 15 nm, which was calculated from a BET value (specific surface area) of the lithium cobaltate powder and amounts of the used lithium and niobium, and which was used for coating a particle surface of the lithium cobaltate powder.

(Measurement of an Amount of Carbon in the Lithium Cobaltate Powder with the Surface Coated with the Lithium Niobate)

An amount of carbon in the lithium cobaltate powder with the surface coated with the lithium niobate, was measured using EMIA-U510 produced by HORIBA, Ltd., which is an analyzer of a small amount of carbon/sulfur.

As a result of the measurement by the above-mentioned method, it was found that the amount of the carbon in the lithium cobaltate powder with the surface coated with the lithium niobate was 0.013 mass % in example 1.

(A Method of Measuring the Powder Compact Resistance of the Lithium Cobaltate Powder with the Surface Coated with the Lithium Niobate)

The electric resistance value (powder compact resistance) of the powder compact of the lithium cobaltate powder with the surface coated with the lithium niobate, was measured using a powder measurement system MCP-PD51 produced by Mitsubishi Chemical Corporation. Specifically, 1 g of a lithium cobaltate powder sample was put in a mold having a size of ϕ20 mm, and a pressure of 12 kN was added thereto, to obtain a powder compact, and the electric resistance value (powder compact resistance) of the powder compact was measured.

Then, it was found that the powder compact resistance of the powder compact of the lithium cobalt ate powder with the surface coated with the lithium niobate was 3.4× $10^3 \Omega \cdot cm$ in example 1.

An evaluation result thereof is shown in table 1.

Example 2

The lithium cobaltate powder with the surface coated with the lithium niobate according to example 2 was produced similarly to example 1, excluding a point that 0.220 g of lithium nitrate ($LiNO_3$) was used instead of 0.134 g of lithium hydroxide·1hydrate ($LiOH \cdot H_2O$), as the lithium compound in example 1.

An evaluation similar to example 1 was performed to the lithium cobaltate powder with the surface coated with the lithium niobate in example 2. The evaluation result thereof is shown in table 1.

Example 3

The lithium cobaltate powder with the surface coated with the lithium niobate according to example 3 was produced similarly to example 1, excluding a point that 0.204 g of lithium sulfate·1hydrate ($Li_2SO_4.H_2O$) was used instead of 0.134 g of lithium hydroxide·1hydrate ($LiOH.H_2O$), as the lithium compound used in example 1.

The evaluation similar to example 1 was performed to the lithium cobaltate powder with the surface coated with the lithium niobate in example 3. The evaluation result thereof is shown in table 1.

Comparative Example 1

The lithium-transition metal oxide powder according to comparative example 1 was produced by a method described below.

1.7 g of Nb ethoxide ($Nb(OC_2H_5)_5$) and 2.03 g of methanol solution which contains Li methoxide ($LiOCH_3$) at 10% of concentration were added and stirred in 10 g of ethanol, and 1.37 g of the solution thus obtained was dispensed. Then, 10 g of ethanol was added into the 1.37 g of the dispensed solution, to thereby obtain a LiNb alkoxide solution.

10 g of the lithium cobaltate powder described in example 1 was added into 11.37 g of the LiNb alkoxide solution, and the mixed solution was stirred using the stirrer under heating of 80° C. The temperature was maintained to 80° C. to evaporate the ethanol until it was so judged that the ethanol was completely eliminated visually, to thereby obtain a powder. Thereafter, the powder was heated and dried for 1 hour at 140° C. in the atmosphere, to thereby obtain a dried powder. The obtained dried powder was sintered for 3 hours at 400° C. in the air, to thereby obtain the lithium cobaltate powder with the surface coated with the lithium niobate in comparative example 1.

The average thickness of the lithium niobate used for coating the particle surface of the lithium cobaltate powder with the surface coated with the lithium niobate according to comparative example 1, was calculated similarly to example 1, from the specific surface area of the used lithium cobaltate powder and the amount of the used lithium and niobium, and it was found that the average thickness was 15 nm.

The obtained lithium cobaltate powder with the surface coated with the lithium niobate according to comparative example 1, was evaluated similarly to example 1. The result is shown in table 1.

Comparative Example 2

The lithium cobaltate powder with the surface coated with the lithium niobate according to comparative example 2 was produced similarly to comparative example 1, excluding a point that the method of obtaining the LiNb alkoxide solution was changed to a method of obtaining the LiNb alkoxide solution by adding 3.6 g of Nb ethoxide ($Nb(OC_2H_5)_5$) and 4.3 g of methanol solution which contains Li methoxide ($LiOCH_3$) at 10% of concentration into 10 g of ethanol, and stirring the mixed solution.

The obtained lithium cobaltate powder with the surface coated with the lithium niobate according to comparative example 2, was evaluated similarly to example 1. The result is shown in table 1.

REFERENCE 1

The lithium cobaltate powder described in example 1, with the surface not coated with the lithium niobate, was produced, to obtain the lithium cobaltate powder in reference 1.

The obtained lithium cobaltate powder according to reference 1 was evaluated similarly to example 1. The result is shown in table 1.

TABLE 1

|  | Nb raw material | Li raw material | Solvent | Average thickness of $LiNbO_3$ (nm) | Powder compact resistance (Ω · cm) | Content of carbon (Mass %) |
| --- | --- | --- | --- | --- | --- | --- |
| Example 1 | Niobium oxide | LiOH | Water | 15 | 3.38E+03 | 0.013 |
| Example 2 | Niobium oxide | $LiNO_3$ | Water | 15 | 1.86E+03 | 0.006 |
| Example 3 | Niobium oxide | $Li_2SO_4$ | Water | 15 | 1.90E+03 | 0.005 |
| Com* example 1 | Nb ethoxide | Li methoxide | Ethanol | 15 | 6.62E+03 | 0.032 |
| Com* example 2 | Nb ethoxide | Li methoxide | Ethanol | 300 | 4.12E+04 | 0.170 |
| Reference 1 | — | — | — | — | 1.29E+03 | 0.009 |

Com* . . . Comparative

The invention claimed is:

1. A lithium-transition metal oxide powder composed of a lithium-transition metal oxide particle with a part or the whole part of a surface coated with a coating layer containing lithium niobate, wherein a carbon-content of the lithium-transition metal oxide powder composed of a lithium-transition metal oxide particle with the coating layer 0.03 mass % or less,
   a thickness of the coating layer is 100 nm or less, and
   a carbon-content of the lithium-transition metal oxide powder with the coating layer of 15 nm average thickness is 0.005-0.013 mass %.

2. The lithium-transition metal oxide powder according to claim 1, wherein a coating thickness of the coating layer containing the lithium niobate, is 1-50 nm.

3. The lithium-transition metal oxide powder according to claim 1, wherein the lithium-transition metal oxide is lithium cobaltate.

4. The lithium-transition metal oxide powder according to claim 3, which powder has a powder compact resistance of 1860-3380Ω·cm when 1 g of said powder is put in a mold with a size of φ20 mm, and a pressure of 12 kN is added thereto, to obtain a powder compact.

5. A positive electrode active material for a lithium ion battery, containing the lithium-transition metal oxide powder of claim 4.

6. A positive electrode active material for a lithium ion battery, containing the lithium-transition metal oxide powder of claim 3.

7. The lithium-transition metal oxide powder according to claim 3, wherein a coating thickness of the coating layer containing the lithium niobate, is from 2 nm to 30 nm.

8. The lithium-transition metal oxide powder according to claim 1, which powder has a powder compact resistance of 1860-3380Ω·cm when 1 g of said powder is put in a mold with a size of φ20 mm, and a pressure of 12 kN is added thereto, to obtain a powder compact.

9. A positive electrode active material for a lithium ion battery, containing the lithium-transition metal oxide powder of claim 8.

10. The lithium-transition metal oxide powder according to claim 8, wherein a coating thickness of the coating layer containing the lithium niobate, is from 2 nm to 30 nm.

11. A positive electrode active material for a lithium ion battery, containing the lithium-transition metal oxide powder of claim 1.

12. A lithium ion secondary battery, wherein the positive electrode active material for the lithium ion battery of claim 11 is used as a positive electrode active material.

13. The lithium-transition metal oxide powder according to claim 1, wherein a coating thickness of the coating layer containing the lithium niobate, is from 2 nm to 30 nm.

* * * * *